United States Patent
Veyo et al.

(10) Patent No.: US 7,951,500 B2
(45) Date of Patent: May 31, 2011

(54) ANODE GAS STACK START-UP HEATER AND PURGE GAS GENERATOR

(75) Inventors: Stephen E. Veyo, Murrysville, PA (US); Raymond A. George, Pittsburgh, PA (US)

(73) Assignee: Siemens Energy, Inc., Orlando, FL (US)

( * ) Notice: Subject to any disclaimer, the term of this patent is extended or adjusted under 35 U.S.C. 154(b) by 1382 days.

(21) Appl. No.: 11/440,819

(22) Filed: May 25, 2006

(65) Prior Publication Data

US 2007/0275282 A1 Nov. 29, 2007

(51) Int. Cl.
*H01M 8/04* (2006.01)
*H01M 8/06* (2006.01)
*H01M 8/24* (2006.01)
*F16L 53/00* (2006.01)

(52) U.S. Cl. ........ 429/440; 429/415; 429/456; 429/512; 137/335

(58) Field of Classification Search .................... 429/17, 429/19–20, 22, 24–26, 31–32, 440, 415, 429/456, 512, 408, 545, 458; 422/188–190; 48/197 R, 198.1; 137/335
See application file for complete search history.

(56) References Cited

U.S. PATENT DOCUMENTS

| | | | |
|---|---|---|---|
| 7,276,096 B2* | 10/2007 | Kaye et al. .................. | 48/198.1 |
| 2001/0014415 A1* | 8/2001 | Iio et al. ........................ | 429/22 |
| 2004/0146763 A1* | 7/2004 | Pondo et al. .................. | 429/26 |
| 2005/0084388 A1* | 4/2005 | Hayes et al. ............... | 417/222.1 |
| 2005/0123808 A1* | 6/2005 | Draper et al. ................. | 429/13 |
| 2006/0093879 A1 | 5/2006 | Yang et al. | |

FOREIGN PATENT DOCUMENTS

| | | |
|---|---|---|
| DE | 10149014 A1 | 4/2003 |
| EP | 0948070 A1 | 10/1999 |

* cited by examiner

*Primary Examiner* — Dah-Wei D Yuan
*Assistant Examiner* — Claire L (Rademaker) Roe

(57) ABSTRACT

In one embodiment the present invention provides for an anode side gas flow heater for a fuel cell generator that comprises a recirculating anode gas flow 28, at least one burner 24, and an energy source 22. The energy source heats the burner, the anode gas flow passes over the at least one burner and is heated, and the heated anode gas flow is then passed through the anode side of the fuel cell generator 4, where the fuel cell generator is heated.

7 Claims, 3 Drawing Sheets

US 7,951,500 B2

ANODE GAS STACK START-UP HEATER AND PURGE GAS GENERATOR

The U.S. Government has a paid-up license in this invention and the right in limited circumstances to require the patent owner to license others on reasonable terms as provided for by the terms of DE-FC26-97FT34139 awarded by DOE.

FIELD OF THE INVENTION

The field of the invention relates to fuel cells, and more specifically to the heating of a fuel cell stack.

BACKGROUND

The temperature of SOFC Fuel cell stacks must be at least 600° C., and typically 750-1000° C., for operation. In order to heat the stack, to operating temperature, the present technique is to force heated air over the cathode side of the fuel cell using an air blower. The air is heated using an electric heater or duct burner in the process air flow path between the blower and the stack. To avoid excessive thermal stresses in the fuel cells, the temperature difference between entering air and a measure of stack average temperature is controlled. For tubular SOFC stacks, the maximum temperature difference is approximately 400° C. Due to heater and ducting material limitations, the maximum air temperature feasible is typically 750° C. Thus, as the stack approaches the temperature of incipient operation, the rate of stack temperature increase decreases dramatically since there is little temperature difference between the air supplying heat and the temperature of the stack.

FIG. 1 illustrates the air path for tubular SOFC stacks. Heated air 2 enters the SOFC generator 4 and is channeled into fuel cells 6 via air feed tubes 8 that extend nearly to the fuel cell's closed end. The air exits the air feed tube at the cell closed end and then flows in counter flow in the annular passage between the air feed tube and the cell inner wall. Heat is transferred from the air to the air feed tube and the fuel cell by radiation and convection and from the air feed tube to the fuel cell via radiation. Air exits the fuel cell at its open end entering the combustion zone/recuperator section and passes out of the generator module at the exhaust nozzle 12. Pressurized fuel (natural gas) enters the generator module at 14 and passes through the nozzle of an ejector (jet pump) at 18. The ejector draws spent fuel from the plenum 19 and mixes it with fresh fuel and subsequently forces it through the pre-reformer at 16 and thence to the in-stack reformers at 17. The in-stack reformers are not shown in detail for drawing clarity. Reformed fuel exits the in-stack reformers at the closed end of the cells and then passes over the exterior of the fuel cell tubes 6, through a baffle into the spent fuel plenum 19. From the spent fuel plenum a fraction passes to the ejector 18 and the remainder passes through a baffle into the combustion zone. The in-stack reformers 17 are heated via radiation heat transfer from the fuel cells 6.

While heating the dormant fuel cell stack to operating temperature it should be noted that the recuperative heat transfer occurring in the combustion zone/recuperator between hot incoming air in the air feed tubes and cooler air exiting the cell open ends is deleterious to the stack heating process. Further, it should be noted that the air exhausted from the generator module at 12 will be approximately the same temperature as the fuel cells and that as the fuel cells increase in temperature this exhaust of hot gas represents a significant loss of energy. Some designs use heat exchangers on the exhausted air to try and recoup some of the wasted heat. Fuel cells that use this type of heating can be found in U.S. Pat. No. 6,764,784 by Gillett, et al, which also introduces further improvements such as purge areas.

What is needed is a method and apparatus that will heat a stack faster and with greater efficiency. Other difficulties with the prior art also exist, some of which will be apparent upon further reading.

SUMMARY OF THE INVENTION

With the foregoing in mind, methods and apparatuses consistent with the present invention, which inter alia facilitates the heating of a solid oxide fuel cell (SOFC) generator. SOFC generators of the prior art have been heated by cathode side hot air flow. The present invention heats the anode side gas flow so that a bulk of the stack can be more directly heated. In addition, the SOFC generators of prior art incorporate recirculation of the anode gas flow, so the bulk of the heated gas of the present invention will be recirculated rather than exhausted. Therefore less heat addition will be required to maintain the gas at a sufficiently high temperature to heat the fuel cells. Since the anode gas flow path handles fuel when the generator is in operation, a burner which is positioned in the anode gas flow path may use SOFC fuel as an energy source.

These and other objects, features, and advantages in accordance with the present invention are provided particular embodiments by an anode side gas flow heater for a fuel cell generator that comprises a recirculating anode gas flow, at least one burner, and an energy source. The energy source heats the burner, the anode gas flow passes over the burner and is heated, and the heated anode gas flow is then passed through the anode side of the fuel cell generator, where the fuel cell generator is heated.

In particular embodiments, the burner directly heats the recirculating anode gas flow, and the energy source may be a fuel, such as the fuel for the fuel cell generator. The burner has multiple stages of burn which can increase the reducing properties of the anode gas flow. Multiple burners may be used, each of which has a burn characteristic that affects the reducing properties of the anode gas flow.

In other particular embodiments the burner indirectly heats the recirculating anode gas flow, and the energy source is a fuel. The fuel may be fuel for the fuel cell generator, but may also be electrical. A plurality of burners may be present and at least one burner is directly heating and at least one burner is indirectly heating, and the directly heating burner is stopped from being used when temperatures within the fuel cell generator reach oxidizing conditions.

In some embodiments approximately 10-15% of the recirculating anode gas flow is lost to exhaust. A supplemental gas flow may be added to the recirculating anode gas flow to replace that lost to the exhaust. The supplemental gas contains approximately 5% hydrogen for the purpose of guaranteeing a reducing environment for the fuel cells.

The fuel cell generator may also be heated via a cathode side hot air flow. Exhaust from the burner may be used to heat the cathode side hot air flow.

In another particular embodiment of the present invention, a solid oxide fuel cell generator comprises a recirculating anode side gas flow that passes over fuel cells in the generator, approximately 75-95% of the anode side gas flow is recirculated and the remaining portion is exhausted. Also there is at least one burner, the anode side gas flow passes over the burner prior to passing over the fuel cells, and a fuel source that enters the burner and mixes with an air flow and is burned by the burner producing heat that directly heats the anode side gas flow. A supplemental gas flow and the fuel source and the air flow equals the amount of anode side gas flow that is exhausted. The supplemental gas flow may contain hydrogen to ensure a reducing bulk anode gas, and at least one of the burners may be adjusted when the generator reaches an oxidizing temperature to produce a more reducing anode side gas flow.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

Figure 1:
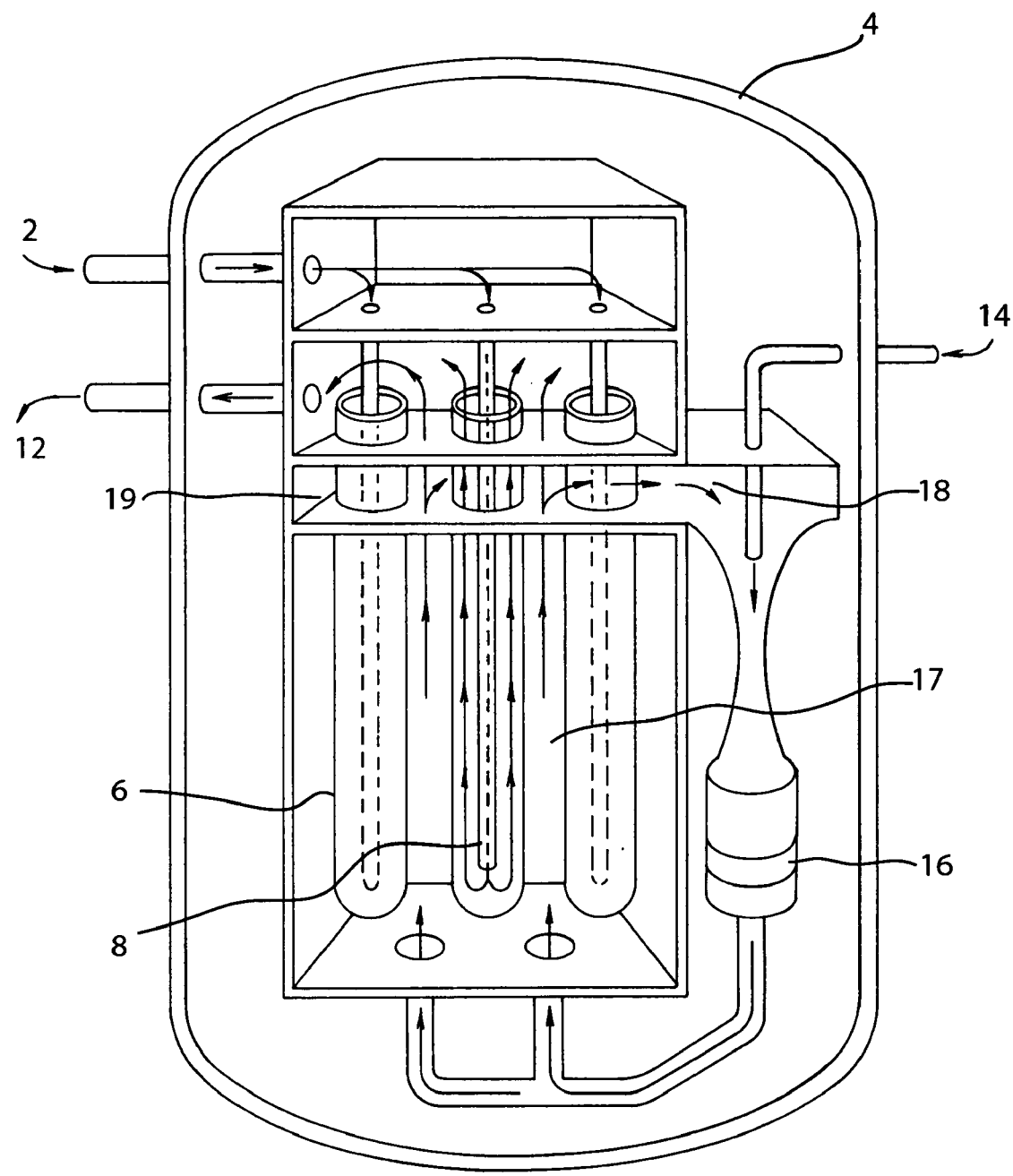
FIG. 1 illustrates an apparatus for heating a stack according to the prior art.

The present invention provides for an anode gas side heating during startup of a solid oxide fuel cell (SOFC) generator. The start-up heaters of the prior art used hot air blown into the air feed tubes to heat the seal-less design SOFC generators. Unfortunately, this heats the generator very slowly since the thermal conductivity through the parts of the generator where the air comes into contact with are poor thermal conductors. Moreover, the air passes back over its own feed tube before being exhausted, which transfers a significant portion of the heat back to the used gas before it is exhausted.

The present invention heats the SOFC generator by circulating heated anode side gas. As is known in the art, the anode gas flow path is the fuel flow path. During normal operation of a SOFC, the major portion of the anode gas flow is recirculated spent fuel gas (about ¾) with fresh fuel addition representing a minor portion. Therefore, when anode gas is heated prior to admission into the region containing fuel cells, it is quite easy to recirculate a large portion of the anode side gas using the existing ejector admitting air or some other gas as the primary fluid or a circulation pump in lieu of said ejector with the addition of make-up gas to compensate for that passing into the combustion zone and then exhausted at 12.

It should be recognized that the present invention does not have to be used in exclusion of the prior art. Although anode side heating of the SOFC has many advantages of the prior art cathode side air flow heating, and the two may be used in conjunction with one another.

The gas on the anode side of the stack may be heated in a variety of different ways. These are categorized as direct and indirect heating. The direct heating indicates that a fuel burn is in direct contact with the gas flow, while with indirect heating the heat source has only thermal contact with the gas flow.

Since the anode side of the generator is made to handle fuel, adding a direct heating source can be accomplished without a large amount of modification. As the SOFC generator will not process fuel to produce heat when it is below at least 600° C., an addition to the system is to add a burner. Although it does not necessarily have to produce flame, the burner will oxidize fuel with air to produce heat. The fuel can be the normal hydrocarbon based SOFC fuel (e.g. natural gas). The fuel can enter the system via its standard route, or a new fuel supply entrance can be positioned near the burner, as will be discussed.

Since a direct heating source exposes the gas flow to the heating source, a portion of the fuel and by products will enter the stack and come into contact with metals such as nickel. When nickel is at low (eg below 400° C.) temperatures, it is resistant to oxidization. Therefore, the anode gas at startup can be oxidizing without deleterious effect. This means that excess oxygen can be added to the burner to bring the generator to operating temperature more quickly. When the stack temperature exceeds about 400° C., metals such as nickel become susceptible to oxidization, which if allowed to occur is deleterious. Therefore, after the stack temperature reaches this point, the anode gas flow must be made chemically reducing.

Typically, if the anode gas contains a maximum of 5% hydrogen it will be chemically reducing without danger of flammability or explosion within the fuel cell stack. After the fuel cell stack temperature exceeds 600° C., the autoignition point for hydrogen in air, the hydrogen content of the anode gas can safely be increased. When the fuel cell temperature becomes sufficient to initiate power generation, then the anode gas must be converted to start-up fuel with a higher hydrogen content, 40-50% hydrogen, and the fuel flow rate must be increased in proportion to the current extracted from the fuel cells until the stack achieves standard operating conditions consistent with the transition to normal fuel (e.g. natural gas). As such, with this embodiment there may be three or more distinct phases of burn/gas flow. These multiple phases can be accomplished by a single burner that has multiple settings depending on stack temperature, or multiple burners can be used each with their own setting. Note that for the multiple setting embodiments as well as a single setting embodiment, there can be multiple burners used at any particular step.

Figure 2:
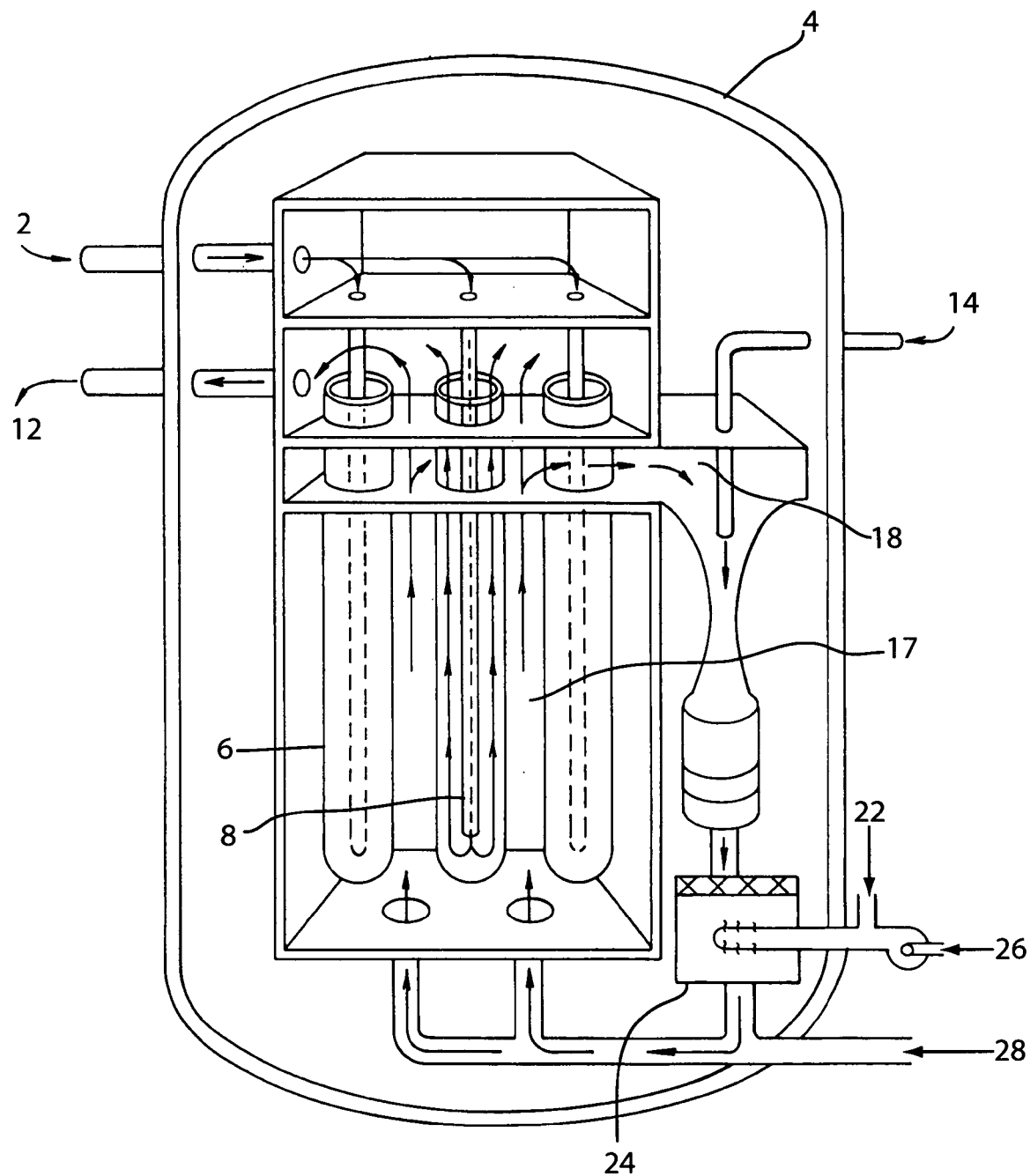
FIG. 2 illustrates an anode side start up heating according to one embodiment of the present invention.

Referring to FIG. 2, one embodiment of a direct burn using a single burner is shown. As mentioned the prior art concepts of using heated air 2 in the SOFC generator 4 may also be used. The heated air 2 is channeled into capped fuel cells 6 via tubes 8. The air then passes back up the tubes, transferring heat along the cell until it enters the recuperator/combustion zone and is exhausted 12. The heat passes from the fuel cells 6 to the stack active/reformer area 17. While the present invention also heats the reformer area 17. The fuel used in the burner may enter the system via the standard operating fuel pipe 14, but in a particular embodiment the fuel enters 22 directly into the burner 24 which may also include an air flow source 26. After passing over the burner the gas is heated and combined with a supplemental gas flow 28 which primarily makes up for the gas that is not recirculated at 18 and lost to the exhaust 12. Note that the supplemental gas at 28 can contain hydrogen so as to ensure a reducing environment for the fuel cells when required. Although the amount of the anode gas lost to the exhaust can depend upon design details and the conditions, a loss of about 10-15% by volume can be expected for most embodiments.

For indirect heating of the SOFC generator, a variety of approaches can be taken. For example, the burner may use SOFC fuel to produce heat, but may then exhaust the gas rather than physically mix it with the anode gas flow. This may be a preferable embodiment where it is desired to control the heating of the anode gas distinctly from the chemistry. As discussed above, the redox considerations of the anode gas warrant that certain mixtures of gas need to be maintained at different temperatures to achieve optimal heating with respect to reducing environments. To avoid this, indirect heating of the anode gas will allow separate and simpler control of the anode gas flow.

Figure 3:
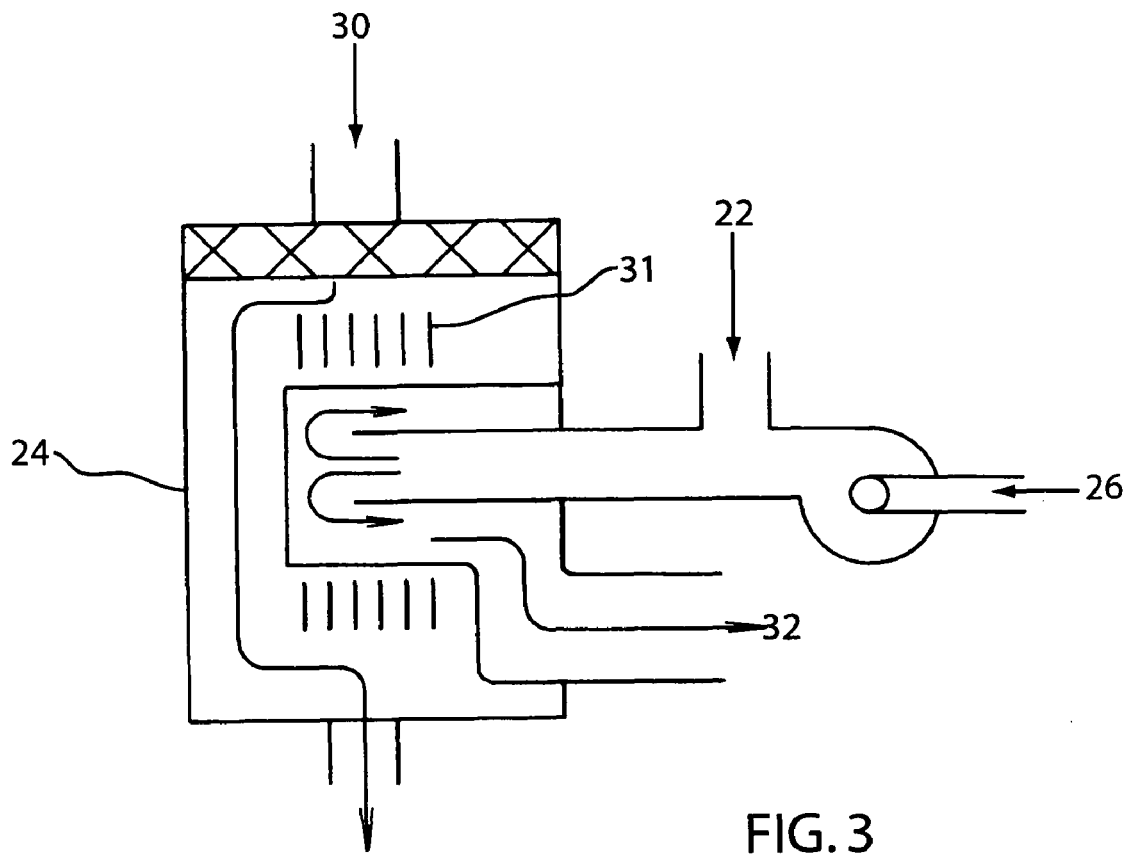
FIG. 3 illustrates an example of indirect heating via a fuel burner.

FIG. 3 illustrates an example of this where anode gas flow 30 passes over a thermal exchanger 31 within the burner 24. The fuel 22 and air 26 that heat the burner are then exhausted directly 32 rather than mixed with the anode gas flow 30. Note that this exhaust may still contain useful heat and may be used, for example, to heat the cathode side air flow.

Figure 4:
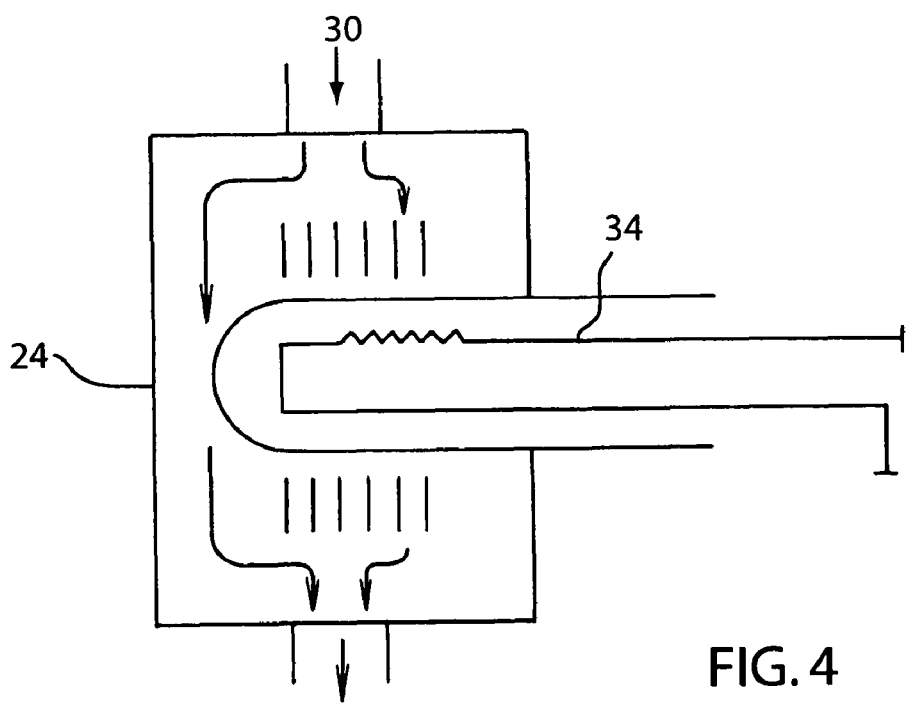
FIG. 4 illustrates an example of an indirect heating via an electrical heater

Additionally, as shown in FIG. 4, an electric heater 34 may be used. Other similar embodiments will be apparent to one of ordinary skill in the art. As discussed, the start-up heating of the present invention may be used in conjunction with the air flow start-up heating of the prior art. In addition to this, the various direct and indirect heating embodiments of the present invention may be used in conjunction with each other as well. For example, a high oxygen direct heating fuel burn may take place when a generator is first being started up, but this will then be switched or tapered to an indirect heating as the temperatures increase.

In one embodiment the present invention provides for an anode side gas flow heater for a fuel cell generator that comprises a recirculating anode gas flow, at least one burner, and an energy source. The energy source heats the burner, the anode gas flow passes over the burner and is heated, and the heated anode gas flow is then passed through the anode side of the fuel cell generator, where the fuel cell generator is heated.

In particular embodiments, the burner directly heats the recirculating anode gas flow, and the energy source may be a fuel, such as the fuel for the fuel cell generator. The burner has multiple stages of burn which can increase the reducing properties of the anode gas flow. Multiple burners may be used, each of which has a burn characteristic that affects the reducing properties of the anode gas flow.

In other particular embodiments the burner indirectly heats the recirculating anode gas flow, and the energy source is a fuel. The fuel may be fuel for the fuel cell generator, but may also be electrical. A plurality of burners may be present and at least one burner is directly heating and at least one burner is indirectly heating, and the directly heating burner is stopped from being used when temperatures within the fuel cell generator reach oxidizing conditions.

In some embodiments approximately 10-15% of the recirculating anode gas flow is lost to exhaust. A supplemental gas flow may be added to the recirculating anode gas flow to replace that lost to the exhaust. The supplemental gas contains approximately 5% hydrogen for the purpose of guaranteeing a reducing environment for the fuel cells.

The fuel cell generator may also be heated via a cathode side hot air flow. Exhaust from the burner may be used to heat the cathode side hot air flow.

In another particular embodiment of the present invention, a solid oxide fuel cell generator comprises a recirculating anode side gas flow that passes over fuel cells in the generator, approximately 75-95% of the anode side gas flow is recirculated and the remaining portion is exhausted. Also there is at least one burner, the anode side gas flow passes over the burner prior to passing over the fuel cells, and a fuel source that enters the burner and mixes with an air flow and is burned by the burner producing heat that directly heats the anode side gas flow. A supplemental gas flow, the supplemental gas flow and the fuel source and the air flow equals the amount of anode side gas flow that is exhausted. The supplemental gas flow may contain hydrogen to ensure a reducing bulk anode gas, and at least one of the burners may be adjusted when the generator reaches an oxidizing temperature to produce a more reducing anode side gas flow.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which is to be given the full breadth of the claims appended and any and all equivalents thereof. For example, the present invention may also be used to affect SOFC cool down, though obviously without the use of heaters.

What is claimed is:

1. An anode side gas flow heater for a fuel cell generator with fuel cells having exterior anodes made to handle fuel comprising:
   a recirculating anode gas flow having reducing properties;
   at least one burner interior to the fuel cell generator and receiving recirculating anode gas flow comprising fresh fuel and spent fuel; and an energy source, where the energy source is fuel, wherein said energy source fuel heats said burner; wherein said recirculating anode gas flow passes over said at least one interior burner and is directly heated; wherein the heated recirculating anode gas flow is then passed through the anode side of said fuel cell generator, and where said fuel cell generator is heated, said anode gas flow passing through an interior jet pump ejector containing a pre-reformer prior to said at least one burner receiving the recirculating anode gas flow; and
   wherein the at least one interior burner is disposed adjacent to the fuel cells within the walls of the fuel cell generator, and said at least one interior burner has multiple stages of burn which can increase reducing properties of said recirculating anode gas flow, wherein approximately 10% to 15% of the recirculating anode gas flow is exhausted, and a supplemental gas flow is added to said recirculating anode gas flow to replace that gas lost to the exhaust.

2. The anode side gas flow heater for a fuel cell generator of claim 1, wherein a plurality of interior burners are used, each of which has a burn characteristic that affects reducing properties of said anode gas flow.

3. The anode side gas flow heater for a fuel cell generator of claim 1, wherein a plurality of interior burners are present and at least one burner is directly heating and at least one burner is indirectly heating the recirculating anode gas flow.

4. The anode side gas flow heater for a fuel cell generator of claim 3, wherein said directly heating interior burner is stopped from being used when temperatures within said fuel cell generator reach oxidizing conditions.

5. The anode side gas flow heater for a fuel cell generator of claim 1, wherein said supplemental gas flow contains approximately 5% hydrogen for the purpose of guaranteeing a reducing environment for the fuel cells.

6. The anode side gas flow heater for a fuel cell generator of claim 1, wherein said fuel cell generator is also heated via a cathode side hot air flow.

7. The anode side gas flow heater for a fuel cell generator of claim 6, wherein exhaust from said at least one burner is used to heat said cathode side hot air flow.

* * * * *